United States Patent [19]

Smeal et al.

[11] Patent Number: 5,369,201
[45] Date of Patent: Nov. 29, 1994

[54] LAMINATING RESINS HAVING LOW ORGANIC EMISSIONS

[75] Inventors: Thomas W. Smeal, Murrysville; George L. Brownell, Mount Lebanon Township, Allegheny County, both of Pa.

[73] Assignee: Aristech Chemical Corporation, Pittsburgh, Pa.

[21] Appl. No.: 204,924

[22] Filed: Mar. 2, 1994

Related U.S. Application Data

[62] Division of Ser. No. 47,526, Apr. 19, 1993, Pat. No. 5,292,841.

[51] Int. Cl.$^5$ ............................................. C08F 24/00
[52] U.S. Cl. ......................................... 526/273; 526/313
[58] Field of Search ............................. 526/273, 313

[56] References Cited

U.S. PATENT DOCUMENTS

| | | | |
|---|---|---|---|
| 3,624,180 | 11/1971 | Schmid et al. | 260/835 |
| 4,102,942 | 7/1978 | Smith et al. | 260/836 |
| 4,310,644 | 1/1982 | Miley | 525/507 |
| 4,314,930 | 2/1982 | Gardner | 260/42.18 |
| 4,348,500 | 9/1982 | Robeson et al. | 525/65 |
| 4,394,494 | 7/1983 | Miyake et al. | 526/301 |
| 4,414,367 | 11/1983 | Gardner | 525/531 |
| 4,434,286 | 2/1984 | Burhans et al. | 528/297 |
| 4,525,498 | 6/1985 | Atkins et al. | 523/511 |
| 4,585,833 | 4/1986 | Domeier | 525/260 |
| 4,673,706 | 6/1987 | Atkins | 525/31 |
| 4,859,716 | 8/1989 | Ibsen et al. | 522/14 |

OTHER PUBLICATIONS

Union Carbide Brochure entitled "Cycloaliphatic Epoxide Systems", selected pages, 1987.
The Dow Chemical Company Brochure entitled "Derakane Vinyl Ester Resins for Corrosion Resistance", selected pages, 1974.

*Primary Examiner*—Joseph L. Schofer
*Assistant Examiner*—N. Sarofim
*Attorney, Agent, or Firm*—William L. Krayer

[57] ABSTRACT

A laminating resin comprising (A) an acrylated or methacrylated cycloaliphatic epoxide, (B) an acrylated or methacrylated alkoxylated bisphenol-A, in a weight ratio of (A) to (B) of about 3 to 1 to about 1 to 5, and (C) about 5% to about 50%, based on the total composition, cyclohexyl methacrylate. Vinyl toluene and ethylene glycol dimethacrylate are also used to modify certain properties of the resin.

3 Claims, No Drawings

LAMINATING RESINS HAVING LOW ORGANIC EMISSIONS

This is a of continuation of application Ser. No. 047,526, filed Apr. 19, 1993 now U.S. Pat. No. 5,292,841.

TECHNICAL FIELD

This invention relates to resin compositions which cure as they are shaped, laminated, brushed, sprayed or otherwise placed into the space where they are to form a product; such resins are broadly known as laminating resins, commonly have an unsaturated polyester resin base, and nearly always are employed in a solution of an organic monomer such as styrene. The organic monomer is intended to copolymerize with the resin but typically and notoriously may also tend to volatilize in significant amounts into the workplace environment. The present invention employs a vinyl ester resin rather than a conventional unsaturated polyester, in combination with a particular crosslinking agent. It can be used in existing equipment, procedures, and workplaces, but emits far less monomer than the typical laminating resin heretofore.

BACKGROUND OF THE INVENTION

Many attempts have been made to devise laminating resins having low volatile emissions and still meet the physical specifications and other desirable properties of the end products, while remaining relatively easy to use. In Lee U.S. Pat. No. 4,465,806, for example, a more or less conventional unsaturated polyester resin is combined with, instead of the usual styrene, a reaction product of a polyepoxy compound and acrylic or methacrylic acid which may be the diacrylate of a polyglycidyl ether of bisphenol-A.

Cycloaliphatic epoxides are well known. They have been reacted with various other materials and used in various environments. See the bulletin on cycloaliphatic epoxide systems published by Union Carbide Corporation. The reaction product of such materials with acrylic acid or methacrylic acid are not well known, and although aliphatic epoxys are enumerated as potential ingredients in some vinyl ester resin patents, they are not demonstrated in any nor are they mentioned as a possible use for cycloaliphatic epoxy resins in any of Union Carbide's (the manufacturer) literature. Further, when we formed these vinyl ester resins we found it necessary to depart radically from the accepted ratio of one monounsaturated acid per unreacted epoxy group to a preferred ratio of one monounsaturated acid per 1.6 epoxy groups. This indicated a different chemistry from that found in forming BPA epoxy vinyl ester resins.

Ethoxylated, difunctional, bisphenol-A has been used in the past as an ingredient in various types of resins, generally resins which include a significant diisocyanate component, as in Ford, Jr. et al U.S. Pat. No. 3,876,726.

However, we are not aware of any combinations in the prior art of the types of laminating resins we employ in our invention, namely combinations of alkoxylated difunctional bisphenol-A and vinyl ester resins based on cycloaliphatic epoxides.

SUMMARY OF THE INVENTION

Our new laminating resin comprises three major components.

The first component is an acrylated or methacrylated cycloaliphatic epoxide. That is, it is a composition made by reacting a compound containing a cycloaliphatic epoxide group of the formula

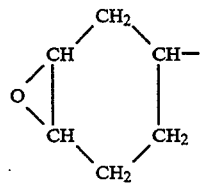

with an organic acid of the formula

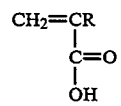

where R is hydrogen or methyl to form a compound containing a group of the formula

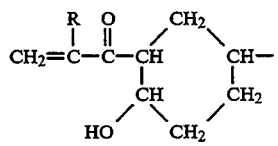

The remainder of the compound may be any one of vinyl, oxide, methyl carboxylate, and adipate but should not be any configuration that results in a viscosity higher than 1,000 cps.

The second component is a diacrylate or dimethacrylate of alkoxylated bisphenol-A of the formula

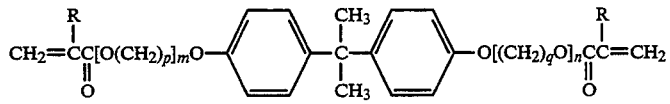

where m and n are independently numbers from 1 to about 10, R is H or CH$_3$, and each group subtended by p and q is independently selected from 2, 3, and 4. These two ingredients may be present in weight ratios of about 3:1 to about 1:5, preferably about 2:1 to about 0.7:1.

The third component is cyclohexyl methacrylate. It may be present in amounts (based on the total of the first two ingredients) between about 20% and about 70%, although we prefer to use about 30% to about 50%.

The composition may also include up to about 30% based on the total of the major ingredients of an additional dimethacrylate crosslinking material such as ethylene glycol dimethacrylate, and up to about 20% vinyl toluene for viscosity adjustment and for its contribution as a monomer. Since our objective is to design a composition which works very well as a laminating resin without significant styrene emissions, the addition of styrene to the recipe defeats that purpose and is not recommended, but the composition will continue to be operable as an excellent laminating resin even though some styrene—say, up to about 10%, is included. The composition will also tolerate many other minor ingredients known to be useful in the unsaturated polyester and laminating art.

DETAILED DESCRIPTION OF THE INVENTION

While the problem at hand is to create a formulation which drastically differs from commercial standard laminating resins in terms of volatile emissions during application, the market dictates that it must be accomplished without significantly altering the widely used equipment and techniques of application. Accordingly, the following criteria are to be kept in mind at all times:

1. Reduced emission of volatile organic compounds—regulations will become more stringent with time.
2. Less potential hazard to human health and the environment—regulations will also become more stringent with time.
3. Minimal increase in cost when commercialized, and reason to believe cost will be reduced in the long run.
4. Compatibility between components of the resin system.
5. Reactivity that is similar to that of styrenated polyester resins.
6. Viscosity that is similar to that of styrenated polyester resins—100 to 300 cps.
7. Physical properties similar to or better than those of styrenated polyester resin.
8. Ability to wet glass and bond to other components of an assembly.

Persons skilled in the art will realize that number 7, relating to physical properties of the final product, can by itself include several important specifications. Thus, the problem is not simply one of finding a monomer which is not as volatile or objectionable as styrene. Rather, many criteria have to be balanced, and, with thousands of chemicals to consider, analysis of the combinations and their effects is extremely difficult. One must decide on the important functions and properties, settle on a systematic but simple screening process, and try to develop a short list of prospective formulations which have a good chance of meeting all the criteria within a practical time period.

Examples of cycloaliphatic epoxides which may be reacted with acrylic acid or methacrylic acid to form the acrylated cycloaliphatic epoxides we use in our invention are:

3,4-epoxy cyclohexylmethyl-3,4-epoxy cyclohexane carboxylate

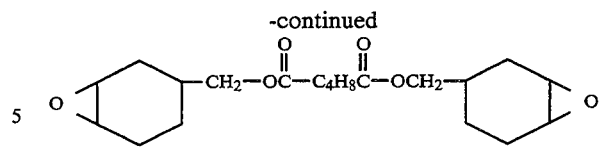

vinyl cyclohexene dioxide

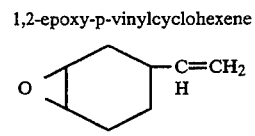

Bis(3,4-epoxy cyclohexyl) adipate

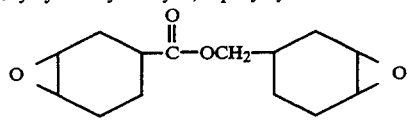

and 1,2-epoxy-p-vinylcyclohexene

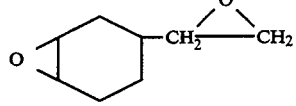

Preparation of a typical methacrylated cycloaliphatic epoxide useful in our invention is as follows:

1.5 mole of 3,4-epoxy cyclohexyl-methyl-3,4-epoxy cyclohexane carboxylate was charged into a reactor, heated to 190° F. and a small amount of tetramethyl ammonium chloride was added; then an inhibited methacrylic acid (1.875 moles) was added dropwise over a period of two hours. The mixture was then elevated to 225° F. and kept at 225° F. or higher until the reaction was complete as indicated by a viscosity of Gardner A to D on a 50/50 mixture with inhibited styrene and an acid number below 15. The resin was then cooled. This resin was designated VE4221.

We have found that molar ratios of unsaturated to cycloaliphatic epoxide higher than about 1.30 will create a reaction mixture that is too viscous when the acid number comes into range; on the other hand, the ratio should not be less than 1.00 because the resultant resin will not have the desired properties.

Liquid resin properties measured in the experiments reported below were gel time, (reported in the tables herein in minutes and seconds, as 13:17, for example), room temperature interval time, which is the time between gelation and the exothermic peak, room temperature exothermic peak which is the highest temperature reached in a 100 g mass of resin during the curing process, Brookfield viscosity, and Barcol hardness by ASTM D2583. For volatile emissions, we followed the Rule 1162 Standard Method for Static Volatile Emissions of the South Coast Air Quality Management District (California). The clear castings tests adopted were as follows:

1. Tensile strength—ASTM D638.
2. Tensile modulus—ASTM D638.
3. Elongation—ASTM D638.
4. Flexural strength—ASTM D790.
5. Flexural modulus—ASTM D790.
6. Heat deflection temperature—ASTM D648.
7. Water absorption at 150° F.—ASTM D570 (modified).

The water absorption test was modified as follows: the temperature was set as 150° F. and long term immersion was set as one week. In the data reported in Table I, MR 14059 is: a vinyl ester resin composed of 2.0 moles Epon 828 epoxy resin (a product of Shell Chemical Corp.), 1.0 moles bisphenol-A and 2.0 moles methacrylic acid. Sartomer CD480 is ethoxylated bisphenol-A dimethacrylate where m and n in the above formula, total 10. Sartomer 348 is ethoxylated bisphenol-A dimethacrylate where m and n in the above formula are both 1. Mod L is 25% hydroquinone and 75% propylene glycol.

From the data in Table I, it can be seen that formulation N, a composition of this invention, has better than acceptable resin properties and clear casting properties, and has volatile emissions far less than any of the others which are based on a vinyl ester resin not of this invention.

TABLE I

|  | E | T | U | V | N |
|---|---|---|---|---|---|
| RESIN | | | | | |
| MR 14059 | 60.00 | 30.00 | 35.00 | 30.00 | — |
| VE4221 | — | — | — | — | 30.00 |
| Sartomer CD480 | — | 20.00 | 15.00 | 10.00 | 30.00 |
| Sartomer 348 | — | 20.00 | 20.00 | 25.00 | — |
| EG Dimethacrylate | 20.00 | 20.00 | 20.00 | 25.00 | — |
| Vinyl Toluene | 20.00 | 10.00 | 10.00 | 10.00 | — |
| Cyclohexyl Methacrylate | — | — | — | — | 40.00 |
| Mod L | 0.10 | 0.15 | 0.20 | 0.15 | 0.10 |
| RESIN PROPERTIES | | | | | |
| Gel time, min:sec | 4:29 | 10:56 | 11:38 | 12:18 | 22:45 |
| Interval, min:sec | 2:36 | 2:52 | 3:38 | 3:22 | 6:30 |
| Exotherm peak, °F. | 309 | 285 | 284 | 302 | 262 |
| Viscosity, cps, 75° F. | 6,780 | 396 | 990 | 538 | 166 |
| 1162 Emissions, G/M2 | 16.4 | 12.1 | 13.9 | 9.7 | 3.6 |
| Barcol hardness | | | | | |
| 45 minutes | 52 | 48 | 49 | 53 | 43 |
| One hour | 52 | 49 | 51 | 52 | 43 |
| 24 hours | 53 | 48 | 51 | 56 | 43 |
| CLEAR CASTING PROPERTIES | | | | | |
| Tensile strength, psi | 7,476 | 9,218 | 8,963 | 8,232 | 10,819 |
| Ten. modulus, 10-5 psi | 0.494 | 0.379 | 0.440 | 0.470 | 0.467 |
| Elongation, % | 1.8 | 4.3 | 2.5 | 2.0 | 3.4 |
| Flexural strength, psi | 19,198 | 13,662 | 16,004 | 15,647 | 15,547 |
| Flex modulus, 10-5 psi | 0.512 | 0.360 | 0.466 | 0.508 | 0.463 |
| Heat deflect. temp, °F. | 204 | 167 | 195 | 217 | 186 |
| Water absorption, % at 150° F. | | | | | |
| One day | 0.52 | 0.69 | 0.89 | 0.77 | 1.15 |
| 7 days | 1.17 | 1.21 | 1.21 | 1.02 | 1.93 |

We claim:

1. A laminating resin composition comprising (A) an acrylated or methacrylated cycloaliphatic epoxide, (B) an acrylated or methacrylated alkoxylated bisphenol-A in a weight ratio of (A) to (B) of about 3 to 1 to about 1:5, (C) about 5% to about 50%, based on the total composition, cyclohexyl methacrylate, and (D) up to about 20% vinyl toluene, by weight based on the total composition.

2. A laminating resin composition of claim 1 wherein vinyl toluene comprises about 5 to about 15% of the total composition.

3. A laminating resin composition of claim 1 including about 5 to about 30% ethylene glycol dimethacrylate.

* * * * *